(12) United States Patent
Iwata et al.

(10) Patent No.: US 8,413,464 B2
(45) Date of Patent: Apr. 9, 2013

(54) METHOD FOR PRODUCING GLASS SUBSTRATE FOR MAGNETIC DISK AND METHOD FOR PRODUCING MAGNETIC DISK

(75) Inventors: Katsuyuki Iwata, Shinjuku-ku (JP); Hideki Isono, Shinjuku-ku (JP); Kenichiro Terada, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/088,815

(22) PCT Filed: Sep. 12, 2007

(86) PCT No.: PCT/JP2007/067751
§ 371 (c)(1),
(2), (4) Date: Mar. 31, 2008

(87) PCT Pub. No.: WO2008/041458
PCT Pub. Date: Apr. 10, 2008

(65) Prior Publication Data
US 2009/0277222 A1 Nov. 12, 2009

(30) Foreign Application Priority Data
Sep. 29, 2006 (JP) ................. 2006-269724

(51) Int. Cl.
*C03C 21/00* (2006.01)
(52) U.S. Cl. ........ 65/30.14; 65/30.1; 65/30.13; 427/108
(58) Field of Classification Search ............ 65/30.1, 65/30.13, 30.14; 427/129, 108–110
See application file for complete search history.

(56) References Cited

U.S. PATENT DOCUMENTS 3,816,222 A * 6/1974 Plumat et al. ............. 428/213
4,102,665 A * 7/1978 Plumat et al. ............. 65/30.13
(Continued)

FOREIGN PATENT DOCUMENTS

| JP | 7309639 A | 11/1995 |
| JP | 2000203888 A | 7/2000 |

(Continued)

OTHER PUBLICATIONS

JP2001192239—Machine Translation.*

(Continued)

*Primary Examiner* — Christina Johnson
*Assistant Examiner* — Lisa Herring
(74) *Attorney, Agent, or Firm* — Sughrue Mion, PLLC

(57) ABSTRACT

The present invention provides a method for producing a glass substrate for a magnetic disk in which the occurrence of micro-waviness on the glass substrate is prevented in a cooling step after a chemically strengthening step so that the glass substrate has a significantly smooth principal surface, and provides a method for producing a magnetic disk in which head crash, thermal asperity failures, and the like are prevented, the flying height of a magnetic head can be decreased, and high-density recording is enabled.
In a method for producing a glass substrate for a magnetic disk including a chemically strengthening step in which a glass substrate is immersed in a heated chemically strengthening salt solution prepared by dissolving a chemically strengthening salt under heating, and metal ions in the glass substrate are ion-exchanged with metal ions in the chemically strengthening salt, wherein the chemically strengthening step is carried out using a chemically strengthening salt solution in which the dissolved chemically strengthening salt does not solidify until the temperature decreases to a temperature that provides hardness at which the surface shape of the glass substrate is not deformed by a force applied to the glass substrate when the chemically strengthening salt having adhered onto the glass substrate solidifies.

12 Claims, 2 Drawing Sheets

| | AMOUNT OF ADDITION (WEIGHT %) | | | | | | OCCURRENCE OF MICRO-WAVINESS | TEMPERATURE AT WHICH CHEMICALLY STRENGTHENING SALT STARTS TO SOLIDIFY (°C) |
|---|---|---|---|---|---|---|---|---|
| | $Ca(NO_3)_2 \cdot 4H_2O$ | $Mg(NO_3)_2 \cdot 6H_2O$ | $Cu(NO_3)_2 \cdot 3H_2O$ | $Co(NO_3)_2$ | $Ni(NO_3)_2 \cdot 6H_2O$ | $AgNO_3$ | | |
| COMPARATIVE EXAMPLE 4 | 0 | 0 | 3 | 0 | 0 | 0 | × | 225 |
| COMPARATIVE EXAMPLE 5 | 0 | 0 | 0 | 3 | 0 | 0 | × | 225 |
| COMPARATIVE EXAMPLE 6 | 0 | 0 | 0 | 0 | 5 | 0 | × | 225 |
| COMPARATIVE EXAMPLE 7 | 0 | 0 | 0 | 0 | 0 | 6 | × | 225 |
| EXAMPLE 3 | 0 | 0 | 6 | 0 | 0 | 0 | ○ | 220 |
| EXAMPLE 4 | 0 | 0 | 0 | 6 | 0 | 0 | ○ | 220 |
| EXAMPLE 5 | 0 | 0 | 0 | 0 | 10 | 0 | ○ | 220 |
| EXAMPLE 6 | 0 | 0 | 0 | 0 | 0 | 12 | ○ | 220 |

U.S. PATENT DOCUMENTS

| | | | | |
|---|---|---|---|---|
| 4,859,636 | A | * | 8/1989 | Aratani et al. .................. 501/72 |
| 6,134,918 | A | * | 10/2000 | Eto et al. ....................... 65/30.14 |
| 6,523,367 | B1 | | 2/2003 | Ikeda et al. |
| 2005/0284179 | A1 | | 12/2005 | Isono et al. |

FOREIGN PATENT DOCUMENTS

| | | | |
|---|---|---|---|
| JP | 2000344549 A | | 12/2000 |
| JP | 2001006168 A | | 1/2001 |
| JP | 2001192239 A | | 7/2001 |
| JP | 2002121051 A | | 4/2002 |
| JP | 2003146703 A | | 5/2003 |
| JP | 2004259402 A | | 9/2004 |
| JP | 2004280945 A | | 10/2004 |
| JP | 2006139873 A | | 6/2006 |
| WO | WO 2007032961 A2 | * | 3/2007 |

OTHER PUBLICATIONS

JP2004259402—Machine Translation.*

Japanese Office Action corresponding to Japanese Patent Application No. 2007-244554, mailed Nov. 4, 2011.

Singapore Office Action (Searched by Austrian Patent Office) and Search Report corresponding to 200802424-2 dated, Aug. 5, 2009.

* cited by examiner

FIG. 1

| | AMOUNT OF ADDITION (WEIGHT %) | | OCCURRENCE OF MICRO-WAVINESS | TEMPERATURE AT WHICH CHEMICALLY STRENGTHENING SALT STARTS TO SOLIDIFY |
|---|---|---|---|---|
| | $Ca(NO_3)_2 \cdot 4H_2O$ | $Mg(NO_3)_2 \cdot 6H_2O$ | | |
| COMPARATIVE EXAMPLE 1 | 0 | 0 | × | 230 °C |
| COMPARATIVE EXAMPLE 2 | 3 | 0 | × | 225 °C |
| COMPARATIVE EXAMPLE 3 | 0 | 3 | × | 225 °C |
| EXAMPLE 1 | 6 | 0 | ○ | 220 °C |
| EXAMPLE 2 | 0 | 6 | ○ | 220 °C |

OCCURRENCE OF MICRO-WAVINESS :
× : OCCURRED
○ : DID NOT OCCUR

FIG. 2

| | Amount of addition (weight %) | | | | | | Occurrence of micro-waviness | Temperature at which chemically strengthening salt starts to solidify (°C) |
|---|---|---|---|---|---|---|---|---|
| | $Ca(NO_3)_2 \cdot 4H_2O$ | $Mg(NO_3)_2 \cdot 6H_2O$ | $Cu(NO_3)_2 \cdot 3H_2O$ | $Co(NO_3)_2$ | $Ni(NO_3)_2 \cdot 6H_2O$ | $AgNO_3$ | | |
| Comparative Example 4 | 0 | 0 | 3 | 0 | 0 | 0 | × | 225 |
| Comparative Example 5 | 0 | 0 | 0 | 3 | 0 | 0 | × | 225 |
| Comparative Example 6 | 0 | 0 | 0 | 0 | 5 | 0 | × | 225 |
| Comparative Example 7 | 0 | 0 | 0 | 0 | 0 | 6 | × | 225 |
| Example 3 | 0 | 0 | 6 | 6 | 0 | 0 | ○ | 220 |
| Example 4 | 0 | 0 | 0 | 0 | 10 | 0 | ○ | 220 |
| Example 5 | 0 | 0 | 0 | 0 | 0 | 0 | ○ | 220 |
| Example 6 | 0 | 0 | 0 | 0 | 0 | 12 | ○ | 220 |

METHOD FOR PRODUCING GLASS SUBSTRATE FOR MAGNETIC DISK AND METHOD FOR PRODUCING MAGNETIC DISK

TECHNICAL FIELD

The present invention relates to a method for producing a glass substrate for a magnetic disk, and more particularly relates to a technique for preventing the occurrence of micro-waviness on the principal surface of a glass substrate in a chemically strengthening step.

BACKGROUND ART

In recent years, with the sophistication of information technology, there have been significant advancements in information recording techniques, in particular, magnetic recording techniques. Magnetic recording media, such as HDDs (hard disk drives), have rapidly decreased in size, decreased in thickness, increased in recording density, and increased in access speed. In a magnetic recording medium, a magnetic disk, which includes a magnetic layer disposed on a disk-shaped substrate, is rotated at high speed, and recording and reproduction are performed while making a magnetic head afloat over the magnetic disk.

With an increase in access speed, the rotation speed of substrates also increases. Therefore, higher strength is required for substrates. Furthermore, with an increase in recording density, there has been a transition in magnetic heads from thin-film heads to magnetoresistive heads (MR heads) or giant magnetoresistive heads (GMR heads). The flying height of a magnetic head above a substrate has decreased to about 8 nm. Under these circumstances, if an irregular shape is present on the surface of magnetic disks, in some cases, crash failures resulting from magnetic head crash or thermal asperity failures, in which read errors are caused by heating due to adiabatic compression of air or contact, may occur.

Consequently, nowadays, as a substrate for a magnetic recording medium, in place of conventional aluminum substrates, glass substrates have been used. The reason for this is that, compared with aluminum substrates composed of metal which is a soft material, glass substrates composed of glass which a hard material are excellent in flatness of the substrate surface, substrate strength, and rigidity.

However, in another aspect, glass substrates are composed of a brittle material. Therefore, various methods for strengthening glass substrates have been proposed. For example, Patent Document 1 (JP-A-2002-121051) describes a structure in which by immersing a glass substrate in a chemically strengthening salt solution heated to about 400° C., lithium ions and sodium ions in a surface layer of the glass substrate are ion-exchanged with sodium ions and potassium ions in the chemically strengthening salt solution, respectively, thereby forming a compressive stress layer on the surface layer of the glass substrate to perform strengthening.

Furthermore, Patent Document 2 (JP-A-2001-192239) describes a structure in which a chemically strengthening process is performed using a chemically strengthening salt solution that contains potassium nitrate and sodium nitrate as main components and less than 1% by weight of a cation component other than potassium and sodium and that has a completely freezing point of 130° C. or lower. According to Patent Document 2, although solidification of some components starts at about 230° C., the solution has sherbet-like flowability until it completely solidifies at about 110° C. Thus, stress/strain can be decreased, and warpage of the glass substrate in the chemically strengthening process can be prevented.

Patent Document 1: JP-A-2002-121051
Patent Document 2: JP-A-2001-192239

DISCLOSURE OF INVENTION

Problems to be Solved by the Invention

In the chemically strengthening step, it has been found that not only overall warpage of the glass substrate but also local micro-waviness occurs. The micro-waviness has a width of about 100 µm, a height of about 0.1 µm, and a length of several millimeters in some cases and is observed as a linear protrusion or depression.

On the other hand, recently, in order to further improve the recording density, a perpendicular magnetic recording method has been employed. Compared with an in-plane magnetic recording method, the perpendicular magnetic recording medium is easily affected more markedly by glass substrates. Therefore, lower roughness and more flatness are required for glass substrates than ever before.

Under these circumstances, there has been a demand for prevention of micro-waviness, which has not been a problem conventionally even if it exists. Note that an object of the technique described in Patent Document 2 is to prevent overall warpage of the substrate, and it is not possible to effectively prevent the micro-waviness.

Accordingly, it is an object of the present invention to provide a method for producing a glass substrate for a magnetic disk in which the occurrence of micro-waviness on the glass substrate is prevented in a cooling step after a chemically strengthening step so that the glass substrate has a significantly smooth principal surface, and to provide a method for producing a magnetic disk in which head crash, thermal asperity failures, and the like are prevented, the flying height of a magnetic head can be decreased, and high-density recording is enabled.

Means for Solving the Problems

The present inventors have diligently studied about the problems described above. As a result, it has been found that micro-waviness occurs in a cooling step after a chemically strengthening step. As a result of more detailed studies on this matter, it has been found that when a chemically strengthening salt having adhered onto a glass substrate solidifies at a certain temperature or lower, micro-waviness does not occur. On the basis of this, chemical strengthening conditions under which chemical strengthening can be performed to an extent that does not cause a practical problem and micro-waviness is not caused have been found, and thus the present invention has been completed.

That is, in order to overcome the problems described above, a typical structure of a method for producing a glass substrate for a magnetic disk according to the present invention is wherein in a method for producing a glass substrate for a magnetic disk including a chemically strengthening step in which a glass substrate is immersed in a heated chemically strengthening salt solution prepared by dissolving a chemically strengthening salt under heating, and metal ions in the glass substrate are ion-exchanged with metal ions in the chemically strengthening salt, wherein the chemically strengthening step is carried out using a chemically strengthening salt solution in which the dissolved chemically strengthening salt does not solidify until the temperature decreases to a temperature that provides hardness at which the surface shape of the glass substrate is not deformed by a force applied to the glass substrate when the chemically strengthening salt having adhered onto the glass substrate solidifies.

Here, the term "a force applied to the glass substrate when the chemically strengthening salt solidifies" includes a physical force due to solidified crystals, and also includes a force due to heat capacity or heat such as heat of solidification. Furthermore, the "temperature that provides hardness at which the surface shape of the glass substrate is not deformed" is preferably a temperature lower than the glass transition point of the glass substrate.

When the chemically strengthening salt is a mixed salt, the individual components start to solidify at different temperatures. In the present invention, until the temperature of the glass substrate decreases to a predetermined temperature, all of chemically strengthening salts intentionally contained in the chemically strengthening salt solution do not solidify. In other words, the temperature at which the component having the highest solidifying temperature among the components of the chemically strengthening salt solution starts to solidify is set lower than the predetermined temperature.

An additive component other than the chemically strengthening salt may be added to the chemically strengthening salt solution so that the predetermined temperature is achieved by freezing-point depression. That is, using the effect of freezing-point depression, it is possible to decrease the temperature at which the component having the highest solidifying temperature among the components of the chemically strengthening salt solution starts to solidify.

The additive component is preferably a metal salt other than $KNO_3$ or $NaNO_3$ as a chemically strengthening salt. In the case where a chemically strengthening process is performed using $KNO_3$ and $NaNO_3$ as chemically strengthening salts, preferably, the additive component does not impair the chemically strengthening process. Specifically, preferably, the additive component does not impair the ion exchange between the glass substrate and the chemically strengthening salt, or the additive component does not degrade the surface shape of the glass substrate when the additive component adheres to the surface of the glass substrate.

The additive component is a salt other than the salt used as a chemically strengthening salt. The additive component may be at least one selected from the group consisting of nitrate salts, nitrite salts, or sulfate salts of Ag, Ca, Ni, Mn, Co, Cu, Li, Mg, Na, and K, and anhydrides or hydrates thereof. Specifically, the additive component may be at least one selected from the group consisting of $AgNO_3$, $Ca(NO_3)_2$, $Ca(NO_3)_2 \cdot 4H_2O$, $Ni(NO_3)_2$, $Ni(NO_3)_2 \cdot 6H_2O$, $Mn(NO_3)_2$, $Mn(NO_3)_2 \cdot 6H_2O$, $Co(NO_3)_2$, $Cu(NO_3)_2$, $Cu(NO_3)_2 \cdot 3H_2O$, $LiNO_3$, $Mg(NO_3)_2$, $Mg(NO_3)_2 \cdot 6H_2O$, $NaNO_2$, $KNO_2$, $Na_2SO_4$, and $K_2SO_4$. In particular, either $NaNO_2$ or $KNO_2$ can be preferably used. By adding the additive component so that the amount of addition is 5% by weight or more in the chemically strengthening salt solution, the solidifying temperature of the chemically strengthening salt can be set a predetermined temperature or lower.

Another typical structure of a method for producing a glass substrate for a magnetic disk according to the present invention is wherein in a method for producing a glass substrate for a magnetic disk including a chemically strengthening step in which a glass substrate is brought into contact with a heated chemically strengthening salt solution to strengthen a surface layer of the glass substrate, wherein the chemically strengthening step is carried out using a chemically strengthening salt solution in which the temperature at which a chemically strengthening salt contained in the chemically strengthening salt solution starts to solidify is 220° C. or lower.

Another typical structure of a method for producing a glass substrate for a magnetic disk according to the present invention is wherein in a method for producing a glass substrate for a magnetic disk including a chemically strengthening step in which a glass substrate is brought into contact with a heated chemically strengthening salt solution to strengthen a surface layer of the glass substrate, wherein the chemically strengthening step is carried out using a chemically strengthening salt solution in which an additive component other than a chemically strengthening salt is added such that the temperature at which the chemically strengthening salt contained in the chemically strengthening salt solution starts to solidify is a predetermined temperature or lower.

As the material for the glass substrate, an aluminosilicate glass can be preferably used. As the material for the glass substrate, although any glass that is chemically strengthened may be used without particular limitations, preferably, an aluminosilicate glass can be used. In particular, an aluminosilicate glass containing lithium is preferable. Such an aluminosilicate glass material preferably contains, as main components, 58% to 75% by weight of $SiO_2$, 5% to 23% by weight of $Al_2O_3$, 3% to 10% by weight of $Li_2O$, and 4% to 13% by weight of $Na_2O$.

A typical structure of a magnetic disk according to the present invention includes forming at least a magnetic layer on a surface of a glass substrate obtained by the method for producing a glass substrate for a magnetic disk described above.

Advantages of the Invention

According to the present invention, in a cooling step after a chemically strengthening step, cooling can be performed while preventing the occurrence of micro-waviness on a glass substrate. Consequently, it is possible to obtain a method for producing a glass substrate for a magnetic disk in which the glass substrate has a significantly smooth principal surface. Furthermore, it is possible to obtain a method for producing a magnetic disk in which head crash, thermal asperity failures, and the like are prevented, the flying height of a magnetic head can be decreased, and high-density recording is enabled.

BRIEF DESCRIPTION OF DRAWINGS

FIG. 1 is a table showing the relationship among the additive component in the chemically strengthening salt solution, the temperature at which solidification starts, and the occurrence of micro-waviness.

FIG. 2 is another table showing the relationship among the additive component in the chemically strengthening salt solution, the temperature at which solidification starts, and the occurrence of micro-waviness.

BEST MODES FOR CARRYING OUT THE INVENTION

An embodiment of a method for producing a glass substrate for a magnetic disk and a method for producing a magnetic disk according to the present invention will be described. FIG. 1 is a table showing the relationship among the additive component in the chemically strengthening salt solution, the temperature at which solidification starts, and the occurrence of micro-waviness. It is to be understood that the specific sizes, shapes, materials, other numerical values, etc. shown in the embodiment below are merely examples for facilitating understanding of the invention, and do not limit the present invention unless otherwise described.

First, a chemically strengthening step and a cooling step in a method for producing a glass substrate for a magnetic disk will be described, and then a chemically strengthening salt solution will be described.

[Chemically Strengthening Step]

A chemically strengthening step is carried out after the principal surface and end face of a disk-shaped glass substrate are subjected to mirror polishing. However, a polishing step, which will be described below, may be provided after the chemically strengthening step. By performing a chemically strengthening process, it is possible to cause high compressive stress in a surface layer of a glass substrate for a magnetic disk, and impact resistance can be improved. In particular, in the case where an aluminosilicate glass is used as the material for the glass substrate, a chemically strengthening process can be suitably performed.

In the chemically strengthening step, ion exchange is performed by bringing a glass substrate into contact with a chemically strengthening salt solution containing ions having a larger ionic radius than ions contained in the glass substrate. As the chemically strengthening salt solution, it is preferable to use a solution in which a nitrate salt containing an alkali metal element, for example, a nitrate salt containing potassium nitrate, sodium nitrate, lithium nitrate, or the like is dissolved. Furthermore, the amount of elemental lithium contained in the chemically strengthening salt solution is preferably 0 to 2,000 ppm. The reason for this is that, when a glass, in particular, an aluminosilicate glass containing elemental lithium is subjected to the chemically strengthening process, such a chemically strengthening salt can provide certain rigidity and impact resistance as the glass substrate for a magnetic disk. If the amount of lithium ions contained in the chemically strengthening salt solution is excessively large, ion exchange is inhibited, and as a result, in some cases, it is difficult to obtain desired tensile stress and compressive stress.

In this embodiment, as the chemically strengthening salt solution, a solution in which $KNO_3$ (potassium nitrate) and $NaNO_3$ (sodium nitrate) as main components are dissolved and an additive component, which will be described below, is further dissolved is used. Lithium ions and sodium ions in a surface layer of the glass substrate are ion-exchanged with sodium ions and potassium ions in the chemically strengthening salt solution, respectively, thereby forming a compressive stress layer on the surface layer of the glass substrate to perform strengthening.

As the ion exchange method, a low-temperature ion exchange method, a high-temperature ion exchange method, a surface crystallization method, a glass surface dealkalization method, or the like is known. It is preferable to use the low-temperature ion exchange method in which ion exchange is performed in a temperature range not exceeding the glass transition point of the glass.

The heating temperature of the chemically strengthening salt solution when the chemically strengthening process is performed is preferably 280° C. to 660° C., and particularly preferably 300° C. to 400° C., from the standpoints that the temperature does not exceed the glass transition point, ion exchange is performed satisfactorily, etc. The time for bringing the glass substrate into contact with the chemically strengthening salt solution is preferably several hours to several tens of hours. Additionally, before the glass substrate is brought into contact with the chemically strengthening salt solution, as preheating, the glass substrate is preferably heated to 100° C. to 300° C.

[Cooling Step]

The glass substrate which has been subjected to the chemically strengthening process is immersed in a water tank at 20° C. to perform quenching and maintained for about 10 minutes. As the temperature decreases, the chemically strengthening salt solution changes from a liquid to a sherbet-like state and a solid in that order.

[Structure for Preventing Micro-Waviness]

At this stage, conventionally, micro-waviness occurred locally on the principal surface of the glass substrate. The micro-waviness is a linear protrusion or depression having a width of about 100 μm, a height of about 0.1 μm, and a length of several millimeters in some cases. The present inventors have found that micro-waviness occurs after the cooling step and occurs at positions of the chemically strengthening salt solidified and remaining on the glass substrate. Based on this, it has been considered that micro-waviness occurs under the influence of solidification of the chemically strengthening salt.

Furthermore, the present inventors have found that the micro-waviness can be prevented if the chemically strengthening salt solution can be solidified at a surface temperature of the glass substrate having surface hardness capable of preventing the occurrence of the micro-waviness.

More specifically, it has been found that micro-waviness does not occur in the case where the temperature at which a chemically strengthening salt solution prepared by dissolving a chemically strengthening salt starts to solidify is lower than the temperature of a glass substrate having surface hardness at which the surface shape of the glass substrate does not change even when an action (force) caused by solidification of the chemically strengthening salt solution is applied to the glass substrate.

That is, as the temperature of the glass substrate increases, the surface hardness thereof decreases. When a force (action) is applied to the glass substrate in a state where the surface hardness is decreased, the surface shape thereof changes. Consequently, when the temperature at which the chemically strengthening salt starts to solidify is lower than the surface temperature of the glass substrate having surface hardness that prevents the occurrence of micro-waviness, the micro-waviness does not occur.

Consequently, in order to prevent the occurrence of micro-waviness, for example, a method in which micro-waviness is prevented using a glass substrate having high surface hardness even at high temperatures, a method in which the occurrence of micro-waviness is prevented by decreasing the temperature at which the chemically strengthening salt solution starts to solidity, or the like may be used.

The effects (actions/forces) applied to the glass substrate when the chemically strengthening salt solution is solidified will be described below.

The first possible effect of solidification of the chemically strengthening salt on the glass substrate is that solidified (crystallized) chemically strengthening salt applies a physical force to the surface of the glass substrate. That is, the glass substrate expands and softens by being heated in the chemically strengthening process step. The glass substrate contracts and hardens by being cooled in the subsequent cooling step. Here, in the state where the glass substrate is expanded and softened, when the chemically strengthening salt adheres to the surface and solidifies, contraction of that portion may be inhibited, and strain may remain.

Furthermore, another possible effect is that due to adherence of crystals of the chemically strengthening salt to the surface of the glass substrate, the heat capacity of that portion is increased, resulting in a decrease in the cooling rate, and strain occurs due to the uneven temperature distribution. Furthermore, since heat of solidification is released when the chemically strengthening salt solidifies, uneven temperature distribution is caused, resulting in strain.

In any case of the above, it is considered that the occurrence of micro-waviness can be prevented by carrying out the chemically strengthening step under the conditions where the dissolved chemically strengthening salt does not solidify until the temperature of the glass substrate decreases to a predetermined temperature that provides hardness which is not affected by the solidification of the chemically strengthening salt.

That is, a force applied to the glass substrate when the chemically strengthening salt solidifies includes a physical force due to solidified crystals, and also includes a force due to heat capacity or heat such as heat of solidification. In the present invention, the chemical strengthening conditions have been achieved by using the chemically strengthening salt solution in which the dissolved chemically strengthening salt does not solidify until the temperature of the glass substrate is decreased to lower than a predetermined temperature in the cooling step.

The predetermined temperature may be appropriately set depending on the material of the glass substrate. Preferably, the predetermined temperature is a temperature that provides hardness at which the surface shape of the glass substrate is not deformed by a force applied to the glass substrate when the chemically strengthening salt having adhered onto the glass substrate solidifies. Alternatively, the predetermined temperature may be set at a temperature equal to or lower than the vicinity of the lower end of the glass transition point Tg of the glass substrate, or on the basis of the slow cooling point, strain point, softening point, or the like.

Furthermore, as the means for adjusting the temperature at which the chemically strengthening salt solution starts to solidify, by adding an additive component other than the chemically strengthening salt, the effect of freezing-point depression can be used. The additive component is preferably a metal salt other than $KNO_3$ or $NaNO_3$ as a chemically strengthening salt. In the case where a chemically strengthening process is performed using $KNO_3$ and $NaNO_3$ as chemically strengthening salts, preferably, the additive component does not impair the chemically strengthening process. Specifically, preferably, the additive component does not impair the ion exchange between the glass substrate and the chemically strengthening salt, or the additive component does not degrade the surface shape of the glass substrate by adhering to the surface of the glass substrate.

As the method for adjusting the temperature at which the chemically strengthening solution starts to solidify, for example, a method may be used in which an additive component other than potassium nitrate and sodium nitrate as chemically strengthening salts is added to the chemically strengthening salts to prepare a chemically strengthening salt solution, and thereby the temperature at which the chemically strengthening salt solution starts to solidify is decreased. By adding the additive component to the chemically strengthening salt, the temperature at which the chemically strengthening salt solution starts to solidify can be decreased due to freezing-point depression.

As the additive component, a component that does not adversely affect the chemically strengthening process is preferably used. For example, at least one can be selected from the group consisting of $AgNO_3$, $Ca(NO_3)_2$, $Ca(NO_3)_2 \cdot 4H_2O$, $Ni(NO_3)_2$, $Ni(NO_3)_2 \cdot 6H_2O$, $Mn(NO_3)_2$, $Mn(NO_3)_2 \cdot 6H_2O$, $Co(NO_3)_2$, $Cu(NO_3)_2$, $Cu(NO_3)_2 \cdot 3H_2O$, $LiNO_3$, $Mg(NO_3)_2$, $Mg(NO_3)_2 \cdot 6H_2O$, $NaNO_2$, $KNO_2$, $Na_2SO_4$, and $K_2SO_4$. In particular, $NaNO_2$ or $KNO_2$ can be preferably used. The reason for this is that $NaNO_2$ or $KNO_2$ does not inhibit ion exchange between the glass substrate and the chemically strengthening solution in the chemically strengthening process.

According to the structure described above, in the cooling step after the chemically strengthening step, cooling can be performed while preventing the occurrence of micro-waviness on the glass substrate. Consequently, it is possible to produce a glass substrate for a magnetic disk so as to have a significantly smooth principal surface. Furthermore, it is possible to obtain a magnetic disk in which head crash, thermal asperity failures, and the like are prevented, the flying height of a magnetic head can be decreased, and high-density recording is enabled.

EXAMPLE

An example of a method for producing a glass substrate for a magnetic disk and a magnetic disk to which the present invention is applied will be described below. The glass substrate for a magnetic disk and the magnetic disk are produced for a magnetic disk having a predetermined shape, such as a 0.8-inch disk (inner diameter 6 mm, outer diameter 21.6 mm, thickness 0.381 mm), a 1.0-inch disk (inner diameter 7 mm, outer diameter 27.4 mm, thickness 0.381 mm), or a 1.8-inch disk (inner diameter 12 mm, outer diameter 48 mm, thickness 0.508 mm). Furthermore, the magnetic disk may be produced as a 2.5-inch disk or a 3.5-inch disk.

(1) Shape-Forming Step and First Lapping Step

First, molten aluminosilicate glass was formed into a disk shape by direct pressing using an upper mold, a lower mold, and a body mold, and thereby an amorphous planar glass was obtained. As the aluminosilicate glass, a glass for chemical strengthening was used. Instead of direct pressing, a disk-shaped glass substrate for a magnetic disk may be cut, using a grinding wheel, from a sheet glass formed by a down-draw process or a float process. The material for the glass substrate is not particularly limited as long as it can be chemically strengthened. Preferably, an aluminosilicate glass is used. In particular, an aluminosilicate glass containing lithium is preferred.

Such an aluminosilicate glass material preferably contains, as main components, 58% to 75% by weight of $SiO_2$, 5% to 23% by weight of $Al_2O_3$, 3% to 10% by weight of $Li_2O$, and 4% to 13% by weight of $Na_2O$. Note that the aluminosilicate glass used here is composed of 63.6% by weight of $SiO_2$, 14.2% by weight of $Al_2O_3$, 10.4% by weight of $Na_2O$, 5.4% by weight of $Li_2O$, 6.0% by weight of $ZrO_2$, and 0.4% by weight of $Sb_2O_3$.

Next, both principal surfaces of the planar glass was subjected to lapping to obtain a disk-shaped glass base. The lapping was performed with a double-sided lapping apparatus having a planetary gear mechanism, using loose alumina-based grains. Specifically, a pressure was applied to upper and lower surfaces of the planar glass placed between lapping plates. Then, a grinding fluid containing loose grains was supplied onto the principal surfaces of the planar glass, and these are relatively moved to perform lapping. A glass base having flat principal surfaces was obtained by the lapping.

(2) Cutting Step (Coring, Forming)

Next, the glass base was cut using a diamond cutter, and a disk-shaped glass substrate was cut from the glass base. Then, using a cylindrical diamond drill, an inner hole was formed in the center of the glass substrate to obtain an annular glass substrate (coring). Then, the inner peripheral end face and the outer peripheral end face were subjected to grinding with a diamond grinding wheel to perform predetermined chamfering (forming).

(3) Second Lapping Step

Next, both principal surfaces of the resulting glass substrate were subjected to second lapping as in the first lapping step. By carrying out the second lapping step, the fine irregular shape formed on the principal surfaces in the previous steps, i.e., the cutting step and the end-face polishing step, can be removed in advance, and the subsequent polishing step carried out on the principal surfaces can be completed for a short period of time.

(4) End-Face Polishing Step

Next, the end face of the glass substrate was subjected to mirror polishing by brushing. In this step, a slurry containing cerium oxide grains (loose grains) was used as the polishing grains. Then, the inner peripheral end face was subjected to mirror polishing by magnetic abrasive finishing. The glass substrate having undergone the end-face polishing step was cleaned with water. By the end-face polishing step, the end face of the glass substrate was polished into a mirror state capable of preventing dusting of particles or the like.

Additionally, in the end-face polishing step, glass substrates are stacked, and the end faces are polished. In order to prevent the principal surfaces of the glass substrate from having flaws and the like at this stage, the end-face polishing step may be carried out before a first polishing step or before and after a second polishing step, which will be described later.

(5) Principal Surface Polishing Step

First, as the principal surface polishing step, a first polishing step was carried out. The first polishing step is performed mainly for the purpose of removing flaws and strain remaining from the lapping step on the principal surfaces. In the first polishing step, the principal surfaces were polished with a double-sided polishing apparatus having a planetary gear mechanism, using a hard resin polisher. As the abrasive, cerium oxide grains were used.

The glass substrate having undergone the first polishing step was immersed in cleaning tanks respectively containing a neutral detergent, pure water, and IPA (isopropyl alcohol) in that order to perform cleaning.

Next, as the principal surface polishing step, a second polishing step was carried out. The second polishing step is performed for the purpose of finishing the principal surfaces into a mirror-like state. In the second polishing step, the principal surfaces were subjected to mirror polishing with a double-sided polishing apparatus having a planetary gear mechanism, using a soft resin foam polisher. As the abrasive, finer cerium oxide grains than those used in the first polishing step were used.

The glass substrate having undergone the second polishing step was immersed in cleaning tanks respectively containing a neutral detergent, pure water, and IPA (isopropyl alcohol) in that order to perform cleaning. Ultrasound was applied to each of the cleaning tanks.

By carrying out the second polishing step, cracks on the principal surfaces of the glass substrate are removed, and the maximum value of micro-waviness on the principal surface is set to be, for example, 5 nm or less. The maximum value of micro-waviness is obtained by measuring the waviness having a frequency with a wavelength of 4 μm to 1 mm by non-contact laser interferometry, using a "Micro XAM" manufactured by PHASE SHIFT TECHNOLOGY INC. The measurement was performed in a rectangular area with sides of 800 μm and 980 μm (800 μm×980 μm).

(6) Chemically Strengthening Step

Next, the glass substrate having undergone the lapping step and the polishing step was subjected to chemical strengthening. In the chemical strengthening, a chemically strengthening salt solution in which potassium nitrate (60%) and sodium nitrate (40%) were mixed and 5% by weight of $Ca(NO_3)_2$ was further added was prepared. The chemically strengthening salt solution was heated to 400° C., and the cleaned glass substrate was preheated to 300° C. and immersed in the chemically strengthening salt solution for about 3 hours. In the immersion process, in order to chemically strengthen the entire surfaces of glass substrates, a plurality of glass substrates were placed in a holder such that the end faces were held.

In such a manner, by performing immersion in the chemically strengthening salt solution, lithium ions and sodium ions in a surface layer of the glass substrate were replaced by sodium ions and potassium ions in the chemically strengthening salt solution, respectively, and thereby the glass substrate was strengthened. A compressive stress layer formed on the surface layer of the glass substrate was about 100 to 200 μm.

The glass substrate having undergone the chemically strengthening process was immersed in a water tank at 20° C. to perform quenching and maintained for about 10 minutes. The quenched glass substrate was immersed in concentrated sulfuric acid heated to about 40° C. to perform cleaning. The glass substrate cleaned with sulfuric acid was further immersed in cleaning tanks respectively containing pure water and IPA (isopropyl alcohol) in that order to perform cleaning.

By performing the first lapping step, the cutting step, the end-face polishing step, the second lapping step, and the first and second polishing steps, and the chemically strengthening step as described above, a flat, smooth, highly rigid glass substrate for a magnetic disk was obtained.

(7) Magnetic Disk Production Step

A perpendicular magnetic recording disk was produced by depositing an adhesive layer composed of a Cr alloy, a soft magnetic layer composed of a CoTaZr-based alloy, an underlying layer composed of Ru, a perpendicular magnetic recording layer composed of CoCrPt-based alloy, a protective layer composed of hydrogenated carbon, and a lubricant layer composed of perfluoroether in that order on each surface of the glass substrate obtained by the steps described above. This structure is an example of the structure of the perpendicular magnetic disk. A structure may also be used in which a magnetic layer, etc. is formed as an in-plane magnetic disk.

[Evaluations]

FIGS. 1 and 2 are each a table showing the relationship between the temperature at which solidification starts and the occurrence of micro-waviness when $Ca(NO_3)_2.4H_2O$ or $Mg(NO_3)_2.6H_2O$ was added as an additive component. In FIGS. 1 and 2, x indicates that micro-waviness occurred, and O indicates that micro-waviness did not occur.

In Comparative Example 1, the chemically strengthening salt solution as a standard was prepared by mixing potassium nitrate (60%) and sodium nitrate (40%). In Comparative Example 2, 3% by weight of $Ca(NO_3)_2.4H_2O$ was added; in Comparative Example 3, 3% by weight of $Mg(NO_3)_2.6H_2O$ was added; in Example 1, 6% by weight of $Ca(NO_3)_2.4H_2O$ was added; and in Example 2, 6% by weight of $Mg(NO_3)_2.6H_2O$ was added.

As is evident from the tables, in Comparative Example 1 in which no additive component was added, the temperature at which solidification starts was 230° C. Regardless of the additive component, in Comparative Examples 2 and 3 in which 3% by weight was added, the temperature at which solidification starts decreased to 225° C., and in Examples 1 and 2 in which 6% by weight was added, the temperature at which solidification starts decreased to 220° C. In Comparative Examples 1 to 3, micro-waviness occurred. In contrast, in Examples 1 and 2, it was possible to prevent the occurrence of micro-waviness.

Consequently, it is clear that by carrying out a chemically strengthening step using a chemically strengthening salt solution in which the temperature at which a chemically strengthening salt starts to solidify is set at 220° C. or lower, the occurrence of micro-waviness can be prevented. Furthermore, when $Ca(NO_3)_2$ is used, it is clear that by adding $Ca(NO_3)_2$ in an amount of 5% by weight or more in the chemically strengthening salt solution, the temperature at which a chemically strengthening salt starts to solidify can be controlled to a temperature at which the occurrence of micro-waviness can be prevented.

Furthermore, in the production method shown in this embodiment, the cooling step in which cooling is actively performed has been described. However, the present invention is not limited thereto, and the advantages of the present invention can also be achieved even in the case where the workpiece is slowly cooled by being left to stand in air, or in the case where slow cooling is further performed in a constant-temperature bath.

While the preferred examples of the present invention have been described with reference to attached drawings, it is to be understood that the present invention is not limited to such examples. It is apparent to persons skilled in art that, within the scope of the claims, various modified examples and corrected examples are conceivable, and it is to be understood that these examples of course belong to the technical range of the present invention.

Industrial Applicability

The present invention relates to a method for producing a glass substrate for a magnetic disk and a method for producing a magnetic disk, and can be used as a technique for preventing the occurrence of micro-waviness on the principal surface of the glass substrate, in particular, in the chemically strengthening step.

The invention claimed is:

1. A method for producing a glass substrate for a magnetic disk comprising:
    a glass substrate polishing step;
    a chemically strengthening step in which a glass substrate is immersed in a chemically strengthening salt solution prepared by dissolving a chemically strengthening salt under heating, and metal ions in the glass substrate are ion-exchanged with metal ions in the chemically strengthening salt; and
    a cooling step of cooling the glass substrate after the chemically strengthening step,
    wherein the chemically strengthening step is carried out using the chemically strengthening salt solution comprising $KNO_3$ and $NaNO_3$ as a main component of the chemically strengthening salt and an additive component other than the chemically strengthening salt, which is added in an amount of 6% by weight or more in the chemically strengthening salt solution so that the chemically strengthening salt solution does not start to solidify until a temperature decreases to a predetermined temperature at which a surface shape of the glass substrate is not deformed by a force applied to the glass substrate when the chemically strengthening salt having adhered onto the glass substrate after the chemically strengthening step solidifies in the cooling step,
    whereby, as a result of said steps, a maximum value of micro-waviness on a principal surface of the glass substrate is made to be less than 5 nm when waviness is measured having a frequency with a wavelength of 4 μm to 1 mm and is measured in a rectangular measurement area with sides of 800 μm and 980 μm of the principal surface of the glass substrate.

2. The method for producing a glass substrate for a magnetic disk according to claim 1, wherein the additive component is at least one selected from the group consisting of $Ca(NO_3)_2$, $Ca(NO_3)_2.4H_2O$, $Ni(NO_3)_2$, $Ni(NO_3)_2.6H_2O$, $Mn(NO_3)_2$, $Mn(NO_3)_2.6H_2O$, $Co(NO_3)_2$, $Cu(NO_3)_2$, $Cu(NO_3)_2.3H_2O$, $LiNO_3$, $Mg(NO_3)_2$, $Mg(NO_3)_2.6H_2O$, $NaNO_2$, $KNO_2$, $Na_2SO_4$, and $K_2SO_4$.

3. The method for producing a glass substrate for a magnetic disk according to claim 1, wherein a material for the glass substrate is an aluminosilicate glass.

4. The method for producing a glass substrate for a magnetic disk according to claim 3, wherein the material for the glass substrate contains, as main components, 58% to 75% by weight of $SiO_2$, 5% to 23% by weight of $Al_2O_3$, 3% to 10% by weight of $Li_2O$, and 4% to 13% by weight of $Na_2O$.

5. A method for producing a magnetic disk comprising forming at least a magnetic layer on a surface of a glass substrate obtained by the method for producing a glass substrate for a magnetic disk according to claim 1.

6. The method for producing a magnetic disk according to claim 5, wherein the method is applied to a magnetic disk for a hard disk drive in which a flying height of a magnetic head is 6 nm or less.

7. The method for producing a glass substrate for a magnetic disk according to claim 1, wherein the polishing step is conducted prior to the chemically strengthening step.

8. The method for producing a glass substrate for a magnetic disk according to claim 1, wherein the polishing step is conducted after the chemically strengthening step.

9. A method for producing a glass substrate for a magnetic disk comprising:
    a chemically strengthening step in which a glass substrate is brought into contact with a heated chemically strengthening salt solution to strengthen a surface layer of the glass substrate; and
    a polishing step for a principle surface of said glass substrate,
    wherein the chemically strengthening step is carried out using a chemically strengthening salt solution comprising $KNO_3$ and $NaNO_3$ as a main component of a chemically strengthening salt and an additive component other than the chemically strengthening salt, which is added in an amount of 6% by weight or more in the chemically strengthening salt solution such that a temperature at which the chemically strengthening salt contained in the chemically strengthening salt solution starts to solidify is a predetermined temperature or lower,
    whereby, as a result of the chemically strengthening and polishing steps, a maximum value of micro-waviness on a principal surface of the glass substrate is made to be less than 5 nm when waviness is measured having a frequency with a wavelength of 4 μm to 1 mm and is measured in a rectangular measurement area with sides of 800 μm and 980 μm of the principal surface of the glass substrate.

10. The method for producing a glass substrate for a magnetic disk according to claim 9, wherein the additive component is at least one selected from the group consisting of $Ca(NO_3)_2$, $Ca(NO_3)_2.4H_2O$, $Ni(NO_3)_2$, $Ni(NO_3)_2.6H_2O$, $Mn(NO_3)_2$, $Mn(NO_3)_2.6H_2O$, $Co(NO_3)_2$, $Cu(NO_3)_2$, $Cu(NO_3)_2 \cdot 3H_2O$, $LiNO_3$, $Mg(NO_3)_2$, $Mg(NO_3)_2 \cdot 6H_2O$, $NaNO_2$, $KNO_2$, $Na_2SO_4$, and $K_2SO_4$.

11. The method for producing a glass substrate for a magnetic disk according to claim 9, wherein the polishing step is conducted prior to the chemically strengthening step.

12. The method for producing a glass substrate for a magnetic disk according to claim 9, wherein the polishing step is conducted after the chemically strengthening step.

* * * * *